United States Patent
Diemer, Jr. et al.

(10) Patent No.: US 7,247,200 B2
(45) Date of Patent: Jul. 24, 2007

(54) TITANIUM DIOXIDE FINISHING PROCESS

(75) Inventors: Russell Bertrum Diemer, Jr., Wilmington, DE (US); Alan Roger Eaton, Hendersonville, TN (US); Narayanan Sankara Subramanian, Hockessin, DE (US); Stephen William Taylor, Chadds Ford, PA (US); George A. Schurr, Newark, DE (US); David A Zimmerman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/263,702

(22) Filed: Nov. 1, 2005

(65) Prior Publication Data

US 2007/0095253 A1 May 3, 2007

(51) Int. Cl.
*C09C 1/36* (2006.01)
*C09C 3/04* (2006.01)
*C01G 23/047* (2006.01)

(52) U.S. Cl. .............. 106/437; 106/436; 423/610; 423/611; 423/612

(58) Field of Classification Search ............ 106/436, 106/437; 423/610, 611, 612
See application file for complete search history.

(56) References Cited

U.S. PATENT DOCUMENTS

| | | | |
|---|---|---|---|
| 2,488,439 A | 11/1949 | Schaumann | |
| 2,721,628 A | 10/1955 | Rick | |
| 2,899,278 A | 8/1959 | Lewis | |
| 3,208,866 A * | 9/1965 | Lewis et al. | 106/437 |
| 3,511,308 A | 5/1970 | Nerlinger | |
| 3,726,464 A | 4/1973 | Schurr | |
| 4,083,946 A | 4/1978 | Schurr et al. | |
| 4,222,789 A | 9/1980 | Jacobson | |
| 4,462,979 A | 7/1984 | Stevens et al. | |
| 4,569,387 A | 2/1986 | Hartmann et al. | |
| 4,784,841 A | 11/1988 | Hartmann et al. | |
| 4,937,064 A | 6/1990 | Gonzalez | |
| 5,024,827 A * | 6/1991 | Jones et al. | 423/610 |
| 5,201,949 A * | 4/1993 | Allen et al. | 106/436 |
| 5,266,108 A | 11/1993 | Hauck | |
| 5,728,205 A | 3/1998 | Allen et al. | |
| 5,833,892 A * | 11/1998 | Gurav et al. | 264/13 |
| 6,145,765 A | 11/2000 | Capelle, Jr. et al. | |
| 6,419,893 B1 | 7/2002 | Yuill et al. | |
| 6,562,314 B2 | 5/2003 | Akhtar et al. | |
| 2005/0214200 A1* | 9/2005 | Surender et al. | 423/613 |

FOREIGN PATENT DOCUMENTS

GB 2276157 A * 9/1994

* cited by examiner

*Primary Examiner*—Anthony J. Green

(57) ABSTRACT

This disclosure relates to process for producing titanium dioxide ($TiO_2$) pigments, comprising the following steps: a) oxidizing a mixture of titanium tetrahalide and a rutile forming agent, such as aluminum halide, present in the vapor phase and in the presence of a nucleant to form a gaseous suspension comprising titanium dioxide particles; b) passing the gaseous suspension to a cooling conduit; c) introducing scouring material into the cooling conduit; wherein the particles of the scouring material have a diameter in the range of about 0.25 mm to about 12.7 mm; d) separating the vapor phase to form a powder comprising the titanium dioxide particles and the scouring material; and e) simultaneously subjecting the powder to substantially uniform heating at a temperature of about 300° C. to about 600° C. and reducing the size of the titanium dioxide particles and the particles of the scouring material in the powder to a mean particle size of about 50 nm to about 1000 nm, whereby the titanium dioxide pigment has a chloride content of less than about 500 ppm. The so treated powder may have a residual free chlorine content of less than about 1 ppm.

13 Claims, 1 Drawing Sheet

TITANIUM DIOXIDE FINISHING PROCESS

BACKGROUND OF THE DISCLOSURE

1. Field of the Disclosure

The present disclosure relates to an improved process for making titanium dioxide pigment, and in particular to an improved finishing process for making titanium dioxide pigments.

2. Background of the Disclosure

In producing pigmentary titanium dioxide ($TiO_2$) in rutile form a titanium tetrahalide such as titanium tetrachloride ($TiCl_4$) along with a rutile formation agent such as aluminum trichloride ($AlCl_3$) is reacted in the vapor phase with an oxygen-containing gas in a reactor at a temperature in the range of about 900° C. to 1600° C. to produce a hot gaseous suspension of $TiO_2$ solid particles and free chlorine. This hot gaseous suspension must be quickly cooled below 600° C. within about 1–60 seconds following discharge of the suspension from the reactor. This cooling is accomplished in a conduit, e.g., a flue, which is externally cooled with flowing water so that undesired $TiO_2$ particle size growth is prevented and particle agglomeration is minimized. Particle size and particle agglomeration are important $TiO_2$ pigment properties.

The particle size of the $TiO_2$ pigment can be measured in terms of carbon black undertone (CBU). Pigments containing smaller sized particles have a relatively high CBU, and finished products (e.g., paints, plastics, etc.) containing such pigments tend to have a bluish tint. Pigments with larger sized particles have a relatively low CBU and finished products containing such pigments tend to have a more yellowish tint. The particle agglomeration of the pigment is typically measured in terms of its particle size distribution. Pigments, wherein a low weight percentage of the particles (e.g., less than 30%) have a particle diameter size greater than 0.6 microns, tend to have low particle agglomeration and finished products made with such pigments tend to have high gloss. Pigments, wherein a high weight percentage of the particles have a particle diameter size greater than 0.6 microns, tend to have greater particle agglomeration and finished products made with such pigments tend to have less gloss.

It is known that the production of titanium dioxide pigment may be improved when the $TiCl_4$ and an oxygen-containing gas are reacted in the presence of a nucleant. The method provides $TiO_2$ pigment having improved particle size uniformity, color, and in-process bulk density.

However, in the manufacturing methods described above, the $TiO_2$ particles have a strong tendency to deposit on the inner walls of the cooling conduit. The cooled $TiO_2$ particles tend to form adherent layers on the inner walls and can cause plugging of the conduit. Further, the $TiO_2$ deposits are poor heat conductors and the internal surfaces of the cooling conduit can become insulated which inhibits the heat-exchange properties of the conduit. Scouring material (examples are water-soluble salts like NaCl, KCl, CsCl or insoluble oxides such as $TiO_2$ or $SiO_2$) can be introduced into the cooling conduit to remove the deposits.

The titanium dioxide formed is then subjected to wet treatment, filtration, and drying before the particles are subjected to micronization processes. When the scrubs are water soluble, they dissolve and are removed from the pigment during these processing steps. When they are insoluble, they are separated either by wet screening or by other techniques. A need exists for a streamlined finishing process that eliminates the need for the wet treatment, filtration, and drying steps.

The titanium dioxide product can contain high levels of halogens resulting from upstream processes in which a halogen-containing feedstock, such as titanium tetrahalide is used. The source of halogens in the titanium dioxide product may also be from additives introduced to the process such as one or more halogen-containing rutile-forming agents or nucleants. It is believed that the halides become adsorbed to the surface of the titanium dioxide product, which makes them a challenge to remove. A need exists for a process which is capable of reducing halides from the titanium dioxide product.

SUMMARY OF THE DISCLOSURE

The present disclosure provides a process for producing titanium dioxide pigment, comprising:
a) vapor-phase oxidizing a mixture of titanium tetrahalide and a rutile-forming agent, such as aluminum halide in the presence of a nucleant to form a gaseous suspension comprising titanium dioxide particles;
b) passing the gaseous suspension to a cooling conduit;
c) introducing scouring material, typically selected from the group of calcined titanium dioxide and compressed titanium dioxide, and mixtures thereof, into the cooling conduit; wherein the particles of the scouring material have a diameter in the range of about 0.25 mm to about 12.7 mm and forming a cooled product having a solid and a vapor phase;
d) separating the vapor phase from the cooled product to form a powder comprising the titanium dioxide particles and the scouring material; and
e) subjecting the powder to substantially uniform heating at a temperature of about 300° C. to about 600° C., while reducing the size of at least the titanium dioxide particles of the powder to a mean particle size of about 50 nm to about 1000 nm.

The disclosure is also directed to titanium dioxide pigment having a mean particle size of about 50 nm to about 1000 nm and a chloride content of less than about 500 ppm prepared by heating a powder comprising titanium dioxide particles and scouring material at a temperature of about 300° C. to about 600° C. in a fluid energy mill.

In one embodiment, the disclosure herein can be construed as excluding any element or process step that does not materially affect the basic and novel characteristics of the composition or process. Additionally, the disclosure can be construed as excluding any element or process step not specified herein.

DETAILED DESCRIPTION OF THE DISCLOSURE

Figure 1:
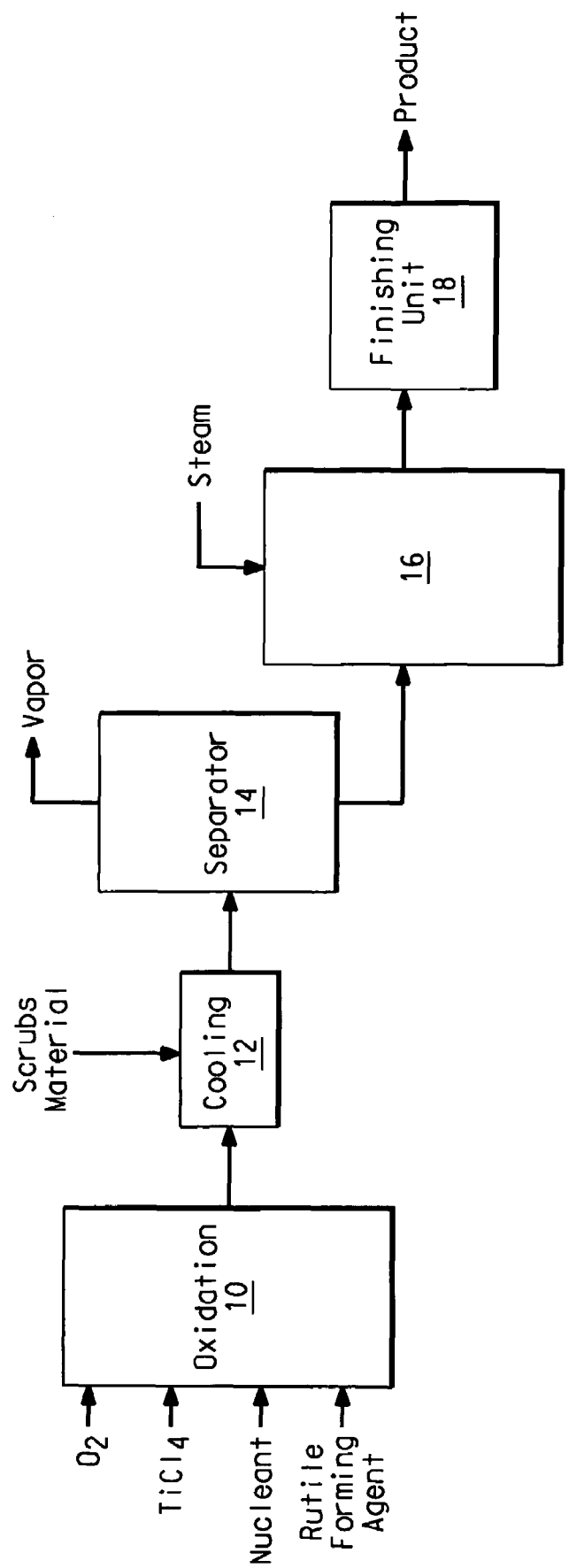
FIG. 1 is a simplified schematic flow diagram of one embodiment of the process of the disclosure.

The production of $TiO_2$ pigment by vapor phase oxidation of a tetrahalide, particularly $TiCl_4$, in the presence of a nucleant is known and disclosed in Lewis et al., U.S. Pat. No. 3,208,866 and Allen et al., U.S. Pat. No. 5,201,949, the disclosures of which are incorporated herein by reference. The present disclosure relates to an improvement in the aforementioned processes.

In the production of TiO$_2$ pigment by the vapor phase oxidation of titanium tetrahalide, various titanium tetrahalides such as titanium tetrachloride, titanium tetrabromide, and/or titanium tetraiodide may be used, but it is preferable to use TiCl$_4$. First, TiCl$_4$ is evaporated and preheated to temperatures of from about 300° C. to about 650° C. and introduced into a reaction zone of a reaction vessel. Rutile forming agents such as aluminum halides, selected from the group of AlCl$_3$, AlBr$_3$ and/or AlI$_3$, that are present in amounts sufficient to provide about 0.5 to about 10% Al$_2$O$_3$, typically about 0.5 to about 5%, and more typically about 0.5 to about 2% by weight, based on total solids formed in the oxidation reaction, are thoroughly mixed with the TiCl$_4$ prior to its introduction into the reaction zone of the reaction vessel. Typically, AlCl$_3$ is used in the process of this disclosure. However, it is also recognized that other co-oxidants and rutile promoters may be added at this point or further downstream in the process.

The oxygen containing gas is preheated to at least 1200° C. and is continuously introduced into the reaction zone through a separate inlet from an inlet for the TiCl$_4$ feed stream. By "reaction zone", it is meant the length of the reactor in which substantial reaction of the reactants takes place. The reaction of O$_2$ and TiCl$_4$ in the vapor phase is extremely fast and is followed by a brief period of particle growth. The oxygen containing gas, which is introduced into the reaction zone, contains a nucleant. By "nucleant", it is meant any substance which can reduce the particle size of the pigment such as metals, oxides, salts, or other compounds of sodium, potassium, lithium, rubidium, cesium, calcium, barium, strontium, or mixtures thereof. The salts, CsCl and KCl, are typical for use in this disclosure.

The pressure for carrying out the oxidation reaction may typically be at least 10 pounds per square inch gage (psig). More typically, the pressure may be at least 20 psig. The upper pressure limit may be the practical upper limit of the process, e.g., typically about 200 psig. The residence time of the reactants in the mixing zone of the reactor may be at least 1 millisecond, typically at least 3 milliseconds. The maximum residence time may be about 25 milliseconds. Typically, the residence time is in the range of about 1 to about 25 milliseconds. By "mixing zone", it is meant the length of the reactor in which substantial mixing of the reactants takes place. The reaction temperature may be at least 800° C. and typically in the range of about 800° C. to about 1800° C. Typically, the reaction occurs in the presence of water vapor.

The hot gaseous suspension of TiO$_2$ particles may then be rapidly cooled in order to prevent undesirable particle growth. In accordance with this disclosure, cooling of the hot gaseous suspension may be performed by methods known in the art. These methods typically involve passing the hot gaseous suspension through a cooling conduit having relatively cool walls in comparison to the gaseous suspension. The walls of the conduit may typically be cooled by passing cool fluid externally over the walls. For example, the conduit may be immersed in cool water. Various forms of conduits or flues, which are typically cooled by water externally, may be used in the process of this disclosure. Examples include, but are not limited to, conventional round pipes and conduits which are described in greater detail in U.S. Pat. Nos. 2,721,626; 3,511,308; 4,462,979; 4,569,387; and 4,937,064 (finned flue). The benefits provided by the process of this disclosure may be especially apparent as the diameter of the conduit is increased. As the hot TiO$_2$ particles come in contact with the relatively cooler surfaces of the inner walls, the particles deposit on the walls and cool to form adherent layers. These deposits and scale may reduce the cooling rate of the reaction mass thereby affecting the quality of the pigment formed.

Scouring material is introduced into the conduit, to remove the TiO$_2$ deposits and substantially improve the quality of pigment formed. Typically, scouring material useful in this disclosure may include calcined or compressed TiO$_2$. Calcined TiO$_2$ scrubs are disclosed in U.S. Pat. Nos. 5,728,205 and 4,784,841. Compressed TiO$_2$ scrubs are disclosed in U.S. Pat. No. 5,266,108. Water-soluble salts are less useful in as much as they cannot be left in the pigment and are not easily separated as are water-insoluble materials other than titania. However materials that disappear such as dry ice, or oxidizable, volatile solid chlorides such as AlCl$_3$ or PCl$_3$ that can result in materials that now become part of the product may be used. If the process does not include a scouring material removal step, minor amounts of other scouring materials may be present as long as they do not deleteriously affect the quality of the titanium dioxide that is prepared.

In this disclosure, the particles of the scouring material typically have a diameter (size distribution) in the range from about 60 mesh (0.0098 inches or 0.250 mm) to about 0.5 inches (12.7 mm). Typically at least 80 wt. %, based on the entire weight of the scouring material, of the particles of the scouring material will be of a size 10 mesh (0.0787 inches or 2.00 mm) or larger. More typically at least 90 wt. % of the particles of the scouring material will be of a size 10 mesh or larger. The particle size distribution of the scouring material is sufficient to provide scrubbing action. If the particle size is too small, the particles will have little kinetic energy for removing wall scale on impact, thus they are more likely to adhere to the wall and become part of the wall scale via solid-state sintering. If the particle size is too large, this may cause feeding problems and insufficient surface area to provide the scrubbing required.

The amount of scouring material used is variable and will depend upon the particular needs. Typically, the addition of an amount of scouring material ranging from about 0.5 to about 20 wt. % scouring material, typically from about 3 to 10 wt. %, based on total TiO$_2$ suspended solids will be found adequate to effect the desired removal of accumulated pigment deposits and will allow a relatively high, uniform rate of heat removal from the product stream. It will be appreciated by those skilled in the art that a sufficient amount of scouring material is added to bring the reaction mass at the end of the conduit to a temperature compatible with downstream process equipment such as cyclones, filters, screw conveyers, etc. Such temperatures may be in the range of about 100° C. to about 600° C.

The scouring material may be added to the conduit by any suitable means. For example, the scouring material may be added intermittently or continuously by gravity from a hopper (or bin) through a solids metering valve to the flue. Continuous feeding to the TiO$_2$ suspension under treatment is typical. The scouring material may be added at any convenient point in the system but is most conveniently added at the front end of the conduit as the product stream discharges from the reactor. Further, the scouring material may be added at a multiple of addition points and especially at those points adjacent to which a relatively severe build-up occurs due to the configuration of the apparatus, such as at return or other forms of bends employed in the system.

Typically, the scouring material does not need to be removed from the TiO$_2$ pigment. It may remain with the pigment and be reduced to the required size along with the pigment in step (e). Any other scouring materials that are capable of being reduced to the desired particle size along with the pigment, disappearing scouring materials and those that are dry separable that were discussed earlier are also useful in this disclosure.

In the present disclosure, process variables such as pressure, reaction temperature, nucleant level and scouring material rate can be adjusted to achieve desired pigment properties such as CBU or agglomeration extent over a wide range of production rates.

In the cooling conduit, a product having a solid phase and a gas phase is formed. The cooled product is withdrawn from the cooling conduit and the vapor phase is separated from the cooled product to form a powder comprising titanium dioxide and the scouring material. The vapor phase is separated from the cooled product by techniques known to one skilled in the art. In a specific embodiment a cyclone may be used to achieve this separation. The powder contains halides such as fluorides, chlorides, bromides and iodides, typically chlorides, resulting from upstream processing.

The powder is subjected to ehalidation whereby the halide content is reduced to less than about 500 ppm, more typically less than about 350 ppm, and still more typically less than about 230 ppm. The lower limit can be as low as possible to detect by suitable analytical techniques.

It is believed that in the dehalidation process the halides adsorbed to the pigment surface that have an affinity to the pigment surface are de-adsorbed and the resulting dead-sorbed products are removed by gas-stripping. By way of example, when the halides are chlorides, in the dechloridation process chlorides adsorbed to the pigment surface are de-adsorbed and the resulting de-adsorbed product, i.e. hydrochloric acid (HCl), is gas-stripped.

The dehalidation, more typically dechloridation, also can reduce residual free halogens such as residual free chlorine in the form of $Cl_2$. Typically, the residual free chlorine can be reduced to less than about 1 ppm.

During the dehalidation, at least the titanium dioxide of the powder is subjected to particle size reduction. Typically, both the titanium dioxide and the scouring material particle sizes are reduced. The particle size reduction can typically be to a particle size of about 50 nm to about 1000 nm, and more typically about 100 nm to about 250 nm.

Dehalidation may be accomplished by substantially uniform heating at temperatures of about 300° C. to about 600° C., more typically about 300° C. to about 450° C., and most typically about 350° C. to about 425° C. If the temperature of the powder entering step (e) is high, less energy is needed in step (e) for particle size reduction and to lower the halide content of the powder. Typically, the temperature of the powder as it enters step (e) is 20° C. to about 375° C., more typically 100° C. to about 250° C. The higher temperatures could be a result of less scouring material being used, which would result in fewer particles having to be ground down to the required particle size, thereby requiring less energy consumption. In a typical embodiment, the simultaneous dehalidation and particle size reduction in step (e) may be accomplished in a fluid energy mill such as a micronizer. The temperature of about 300° C. to about 600° C., more typically about 300° C. to about 450° C., and most typically about 350° to about 425° C. may be accomplished by using heated fluids selected from the group of steam, air, argon, helium, nitrogen and mixtures thereof. Some suitable fluid energy mills are disclosed in U.S. Pat. No. 3,726,484 (Schurr) and U.S. Pat. No. 6,145,765 (Capelle). Some suitable fluid energy mills may be obtained from Fluid Energy Processing & Equipment Company, Hatfield, Pa., or from Hosokawa Micron Powder Systems, Summit, N.J. or Sturtevant, Inc., Hanover, Mass. Grinding aids such as TMP (Trimethylolpropane), chemical structure=$C_2H_5C(CH_2OH)_3$ and TEA (Triethanolamine), chemical structure= $(HOCH_2CH_2)_3N$, may be used to improve grinding efficiency. Substantially uniform heating is accomplished in the size reducing step and is distinguished from heating in a kiln. Although a fully uniform heating would be preferred, substantially uniform heating of the kind that occurs in a fluid energy mill wherein it is likely that a minor portion of the powder is heated at a lower or higher temperature.

The powder formed in step (e) may be used in any fashion known to one skilled in the art. For example, slurries may be prepared using the titanium dioxide powders prepared using the process of this disclosure. Surface treatment may also be provided to enhance the properties of the so prepared powders.

Turning to FIG. 1, FIG. 1 is a simplified schematic flow diagram showing one embodiment of the process of this disclosure. Feedstreams comprising oxygen, titanium tetrachloride, a nucleant and a rutile forming agent are introduced to an oxidation zone 10 wherein, in the vapor phase, the titanium tetrachloride is oxidized to form a gaseous suspension comprising titanium dioxide particles, typically in the rutile form, the gaseous suspension is transferred to a cooling conduit 12 wherein the gaseous suspension is contacted with scouring material to form a cooled product having a solid phase and a vapor phase. The vapor phase is separated from the solid phase via separator 14 to form a powder comprising titanium dioxide particles and the scouring material which is passed to a particle size reducing unit 16. A source of heat is introduced to the size reducing unit 16 to heat the powder in a substantially uniform manner at a temperature ranging from about 300° C. to about 600° C., typically the source of heat is steam, while the size of at least the titanium dioxide particles of the powder is reduced to a mean particle size of about 50 nm to about 1000 nm. The powder can be subjected to heating and simultaneously reducing the size of the titanium dioxide particles of the powder in the size reducing unit 16. Under the conditions of the unit 16, especially the heating conditions, the powder is subjected to dehalidation such that the powder withdrawn from the unit has a halide content of less than about 500 ppm, more typically less than about 350 ppm, and still more typically less than about 230 ppm. The powder withdrawn from the unit can be subjected to surface treating in finishing unit 18.

Applicants specifically incorporate by reference the entire content of all cited references in this disclosure. Further, when an amount, concentration, or other value or parameter is given as either a range, more specific range, or a list of upper values and lower values, this is to be understood as specifically disclosing all ranges formed from any pair of any upper range limit or more specific value and any lower range limit or specific value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

EXAMPLES

The present disclosure is further illustrated by the following examples, but these examples should not be construed as limiting the scope of the disclosure. All parts, percentages and proportions are by weight unless otherwise indicated.

Test Methods

Chloride Level Measurement 10.0+/−0.1 g of dry sample (pigment) were weighed and added to a 250-ml beaker containing 50–75 ml distilled $H_2O$. The pigment was slurried and diluted to approximately the 100-mL mark with distilled water and the pH of the diluted slurry sample was checked. Nitric acid (20% soln.) was added to the slurry dropwise to adjust the pH to 3.0+/−0.5. The slurry was magnetically stirred during the additions. The slurry was then titrated with $AgNO_3$ (0.1 Normal) until the millivolt reading reached 250+10 millivolts (240–260 millivolts. The chloride level in the pigment was calculated as follows:

Chloride (ppm)=ml of 1 N $AgNO_3$×354.5

Carbon Black Undertone

The carbon black undertone (CBU) of a $TiO_2$ pigment sample was measured according to the methods described in U.S. Pat. Nos. 2,488,439 and 2,488,440, the disclosures of which are hereby incorporated by reference, using a benchmark value of 10 rather than 100 as used in the patents. The CBU was measured by mulling together a suitable liquid, such as light colored oil, the $TiO_2$ pigment sample, and carbon black. The mixture was spread on a panel and the relative blueness of the gray mixture was observed. Pigments containing smaller sized particles have a relatively high CBU and a bluer undertone. Pigments with larger sized particles have a relatively low CBU and have a more yellowish undertone.

Screen Pack Dispersion

Dispersion analyses, as defined by particle retention on a 500 mesh screen, were performed on 50 wt % polyethylene (NA206, Equistar) masterbatch concentrates (Farrel Banbury BR1600 produced) containing the particles of interest. Said concentrates were extruded (500 g; Killion ¾ inch single screw extruder, Cedar Grove, N.J.) through a sandwich of fine mesh, metal wire screens (30, 60, 500, 60, 60, 60 mesh) which were then separated, and the magnitude of particles retained on the 500 mesh screen determined using x-ray fluorescence (9200 Series Portable Analyzer, Texas Nuclear Corp., Austin, Tex.).

$TiO_2$ Particle Size and Scrubs Size Measurement Methods

Analyses for median particle size on the $TiO_2$ pigments were performed on sonicated (Sonicator Ultrasonic Liquid Processor Model XL 2020, Heat Systems, Inc., Farmingdale, N.Y.) 3 wt. % solids slurries (made up in a 0.2 g/L tetrapotassium pyrophosphate solution) using a Horiba LA-900 laser light-scattering, particle size analyzer (Horiba Instruments, Inc., Irvine, Calif.) according to ISO 13320.

Scrubs size measurements were conducted using various screen cut sizes, typically from 5 mesh size to 40 mesh size.

Comparative Example A $TiCl_4$ was thoroughly premixed with sufficient $AlCl_3$ to provide one percent by weight $Al_2O_3$ based on total solids formed in the oxidation reaction. The $TiCl_4$ was evaporated, preheated and introduced into a reaction zone. Simultaneously, preheated oxygen was continuously introduced through a separate inlet to the reaction zone. Trace amounts of KCl dissolved in water were added to the oxygen stream as disclosed in Example 1 of Lewis et al., U.S. Pat. No. 3,208,866. The reactant streams were rapidly mixed. The gaseous suspension of titanium dioxide pigment formed in the reactor at a temperature in the range of about 900° C. to 1600° C. was discharged to a cooling conduit (flue) and quickly cooled. Calcined titanium dioxide which served as the scrubbing material to enable heat transfer to cool the reactants stream, was introduced into the gaseous suspension at the front end of the conduit, in an amount of about 2–3 wt. % based on total solids in the conduit as disclosed in Example 1 of U.S. Pat. No. 2,899,278 and in Example 1 of U.S. Pat. No. 4,784,841. The $TiO_2$ pigment was separated from the cooled gaseous products by conventional means. The Carbon Black Undertone (CBU) of the resulting $TiO_2$ pigment, measured as described above, was about 17 and the adsorbed chloride level on the pigment surface was measured at 1640 ppm. The $TiO_2$ pigment as collected had many larger particles including attritioned calcined $TiO_2$ scrubs that if tested for Screen Pack Dispersion values (SPD) as outlined in the procedure above, would result in extremely high and indeterminable values. Therefore, the product made from the above process has to be ground using fluid energy mills and other similar methods to obtain acceptable SPD values as well as proper adsorbed level of chlorides on the surface to meet the required product properties.

The $TiO_2$ pigment obtained was then ground up using a fluid energy mill and high pressure steam. The steam supply temperature to the mill was about 260° C. and the pressure was about 450 psig. Trimethylolpropane (TMP) was used as a grinding aid in the fluid energy mill. Results are shown in Table below.

Example B

The process of comparative Example A was repeated with the following exception: additional heat exchange was added on the steam supply line to the fluid energy mill to produce higher-temperature superheated steam vs. the superheated steam temperature used in Comparative Example A. It was found that these higher steam temperatures enable obtaining a lower level of chlorides, one of the major properties to make a commercially acceptable grade. Results are shown in Table 1 below.

TABLE 1

| Example | Grinding Aid | Micronizer Steam Inlet T, Deg C. | Steam pressure, psig | Chlorides, ppm |
|---|---|---|---|---|
| Comparative Example A | Trimethyloipropane (TMP) | 254.9 | 462.5 | 688 |
| Example B | TMP | 359 | 439.4 | 223 |

The data reported in Table 1 show that a higher micronizer steam inlet temperature provides a commercially acceptable grade of titanium dioxide product which contained 32% fewer chlorides than a product produced wherein the micronizer steam inlet temperature was about 100° C. lower.

The description of illustrative and preferred embodiments of the present disclosure is not intended to limit the scope of the disclosure. Various modifications, alternative constructions and equivalents may be employed without departing from the true spirit and scope of the appended claims.

What is claimed is:

1. A process for producing titanium dioxide pigment, comprising the following steps:
   a) vapor-phase oxidizing a mixture of titanium tetrahalide and a rutile forming agent in the presence of a nucleant to form a gaseous suspension comprising titanium dioxide particles;
   b) passing the gaseous suspension to a cooling conduit;

c) introducing scouring material particles into the cooling conduit, wherein the particles of the scouring material have a diameter in the range of about 0.25 mm to about 12.7 mm and forming a cooled product having a solid and a vapor phase;

d) separating the vapor phase from the cooled product to form a powder comprising the titanium dioxide particles and the scouring material; and e) subjecting the powder to substantially uniform heating at a temperature of about 300° C. to about 600° C. while size reducing at least the titanium dioxide particles of the powder to form titanium dioxide particles having a mean particle size of about 50 nm to about 1000 nm.

2. The process of claim 1 wherein the temperature is of about 300° C. to about 450° C. and is accomplished in a fluid energy mill.

3. The process of claim 2 wherein the fluid energy mill comprises a heated fluid selected from the group consisting of steam, air, argon, helium, nitrogen and mixtures thereof.

4. The process of claim 3 wherein the heated fluid is steam.

5. The process of claim 2 wherein the fluid energy mill is a micronizer and the heating at a temperature of about 300° C. to about 600° C. is accomplished by way of a heated fluid selected from the group consisting of steam, air, argon, helium, nitrogen and mixtures thereof.

6. The process of claim 1 wherein at least one of (a) the titanium tetrahalide is titanium tetrachloride, (b) the rutile-forming agent is aluminum chloride and (c) the nucleant is selected from the group consisting of potassium chloride, cesium chloride or and mixtures thereof.

7. The process of claim 6 wherein the powder comprises chlorides and the chloride content of the size-reduced powder is less than about 500 ppm.

8. The process of claim 5 wherein the powder is heated at a temperature of about 300° C. to about 450° C.

9. The process of claim 5 wherein the powder is heated at a temperature of about 350° C. to about 425° C.

10. The process of claim 1 wherein the titanium dioxide particles and the scouring material particles are reduced to a particle size of about 100 nm to about 250 μm.

11. The process of claim 7 wherein the chloride content of the titanium dioxide particles is reduced to less than about 350 ppm.

12. The process of claim 7 wherein the chloride content of the titanium dioxide particles is reduced to less than about 230 ppm.

13. The process of claim 1 wherein the scouring material is selected from the group consisting of calcined titanium dioxide and compressed titanium dioxide, and mixtures thereof.

* * * * *